United States Patent
Gutta et al.

(10) Patent No.: US 7,136,479 B2
(45) Date of Patent: Nov. 14, 2006

(54) METHOD OF AND APPARATUS WHEREIN A TELEPHONE USER ON HOLD IS NOT REQUIRED TO LISTEN TO AN OBJECTIONABLE AUDIO SIGNAL

(75) Inventors: Srinivas Gutta, Yorktown Heights, NY (US); Miroslav Trajkovic, Ossining, NY (US); Vasanth Philomin, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 424 days.

(21) Appl. No.: 10/175,408

(22) Filed: Jun. 19, 2002

(65) Prior Publication Data

US 2003/0235289 A1    Dec. 25, 2003

(51) Int. Cl.
*H04M 5/00* (2006.01)
*H04M 3/00* (2006.01)
*H04M 3/42* (2006.01)
*H04L 12/66* (2006.01)

(52) U.S. Cl. ............... 379/266.01; 379/201.02; 379/215.01; 370/354

(58) Field of Classification Search .......... 379/266.01, 379/393, 76, 215.01, 201.02; 370/259, 354
See application file for complete search history.

(56) References Cited

U.S. PATENT DOCUMENTS

| 6,208,729 B1 * | 3/2001 | Agraharam et al. ... 379/215.01 |
| 6,400,804 B1 * | 6/2002 | Bilder ...................... 379/76 |
| 6,456,601 B1 * | 9/2002 | Kozdon et al. ............ 370/259 |
| 6,694,012 B1 * | 2/2004 | Posthuma ................. 379/393 |
| 6,751,306 B1 * | 6/2004 | Himmel et al. ........ 379/201.02 |
| 6,952,416 B1 * | 10/2005 | Christie, IV ............... 370/354 |

FOREIGN PATENT DOCUMENTS

| JP | 63-59244 | 3/1988 |
| JP | 2-16850 | 1/1990 |
| JP | 2-177692 | 2/1990 |
| KR | 3633 | 5/1994 |

OTHER PUBLICATIONS

Patent Abstracts of Japan, Pub. No.: 63-059244, Date of Pub. Mar. 15, 1988, http://www1.ipdl.jpo.go.jp/PA1/result/detail/main/wAAAa25503DA363059244P5.htm.
Patent Abstracts of Japan, Pub. No.: 02-016850, Date of Pub. Jan. 19, 1990, http://www1.ipdl.jpo.go.jp/PA1/result/detail/main/wAAAa25503DA402016850P4.htm.
Kang, Shin-Hak, KR9404471B1: Automatic Switching Circuit of Music Signal, Issued May 1994, http://www.delphion.com/details?&pn=KR09404471B1.

* cited by examiner

*Primary Examiner*—Wing Chan
*Assistant Examiner*—Thjuan P. Knowlin
(74) *Attorney, Agent, or Firm*—Aaron Waxler; Paul Im

(57) ABSTRACT

A telephone user who is at a first telephone station and is placed on hold at a second station is prevented from listening to an objectionable audio signal while a call is in process between the user and the second telephone station. The objectionable audio signal is detected while the call is in process and the user is prevented from hearing the objectionable audio signal while the objectionable audio signal is being detected. In response to detection of the end of the objectionable audio signal, the user is coupled to the second telephone station.

20 Claims, 1 Drawing Sheet

METHOD OF AND APPARATUS WHEREIN A TELEPHONE USER ON HOLD IS NOT REQUIRED TO LISTEN TO AN OBJECTIONABLE AUDIO SIGNAL

FIELD OF INVENTION

The present invention relates generally to telephony and more particularly to a telephony method and apparatus wherein a telephone user who is on hold is not required to listen to an objectionable audio signal.

BACKGROUND ART

Frequently, a telephone user, particularly a caller to a business which provides goods or services, is placed on hold while in a queue waiting to be served, or for other reasons. The business placing the telephone user on hold frequently switches the user to an audio signal source, which the user finds objectionable. Such an objectionable audio signal source is music the user finds boring or offensive. In some instances, the user is switched to a radio program which the user also finds objectionable.

At the present time, telephone users who remain on hold under such circumstances have no recourse but to listen to the objectionable audio signal. Many telephone users who remain on hold under such circumstances would prefer to listen to an audio source other than the source transmitted by the business to the user or may wish not to hear any audio signal while waiting to be served.

It is, accordingly, an object of the present invention is to provide a new and improved telephony method and apparatus, wherein a telephone user who remains on hold is not forced to listen to an objectionable audio signal.

Another object of the present invention is to provide a new and improved telephony method and apparatus wherein a telephone user who remains on hold is automatically switched to an audio source of his/her choice, which can include silence, until the hold situation no longer exists.

An additional object of the present invention is to provide a new and improved automatic apparatus for enabling telephone users who remain on hold to avoid listening to objectionable audio signals transmitted to him/her by a different telephone user who puts the user on hold.

SUMMARY OF THE INVENTION

One aspect of the invention relates to a method of enabling a telephone user who is at a first station and is placed on hold at a second station from listening to an objectionable audio signal while a call is in process between the user and the second telephone station. The objectionable audio signal is detected while the call is in process. The user is prevented from hearing the objectionable audio signal while the objectionable audio signal is being detected. The end of the objectionable audio signal is detected while the user is prevented from hearing the objectionable audio signal. In response to detection of the end of the objectionable audio signal, the user is coupled to the second telephone station.

Another aspect of the invention relates to an apparatus for enabling a telephone user who is at a first station and placed on hold at a second station from listening to an objectionable audio signal while a call is in process between the user and the second telephone station. The apparatus comprises a detector for detecting the objectionable audio signal while the call is in process. A processor arrangement coupled to be responsive to the detector is arranged for (a) preventing the user from hearing the objectionable audio signal while the objectionable audio signal is being detected, (b) detecting the end of the objectionable audio signal while the user is prevented from hearing the objectionable audio signal, and (c) coupling the user to the second telephone station in response to detection of the end of the objectionable audio signal.

Preferably, the user is prevented from hearing the objectionable audio signal by substituting an audio signal (including silence) that is a choice of the user for the objectionable audio signal. The audio signal that is a choice of the user is preferably supplied to the user via a telephone at the first station.

Usually, the objectionable audio signal is music that is detected in response to detection of a beat pattern.

The above and still further objects, features and advantages of the present invention will become apparent upon consideration of the following detailed description of a specific embodiment thereof, especially when taken in conjunction with the accompanying drawings.

BRIEF DESCRIPTION OF THE DRAWING

The sole FIGURE is a block diagram of a preferred embodiment of a telephony apparatus in accordance with the present invention.

DETAILED DESCRIPTION OF THE DRAWING

Figure 1:
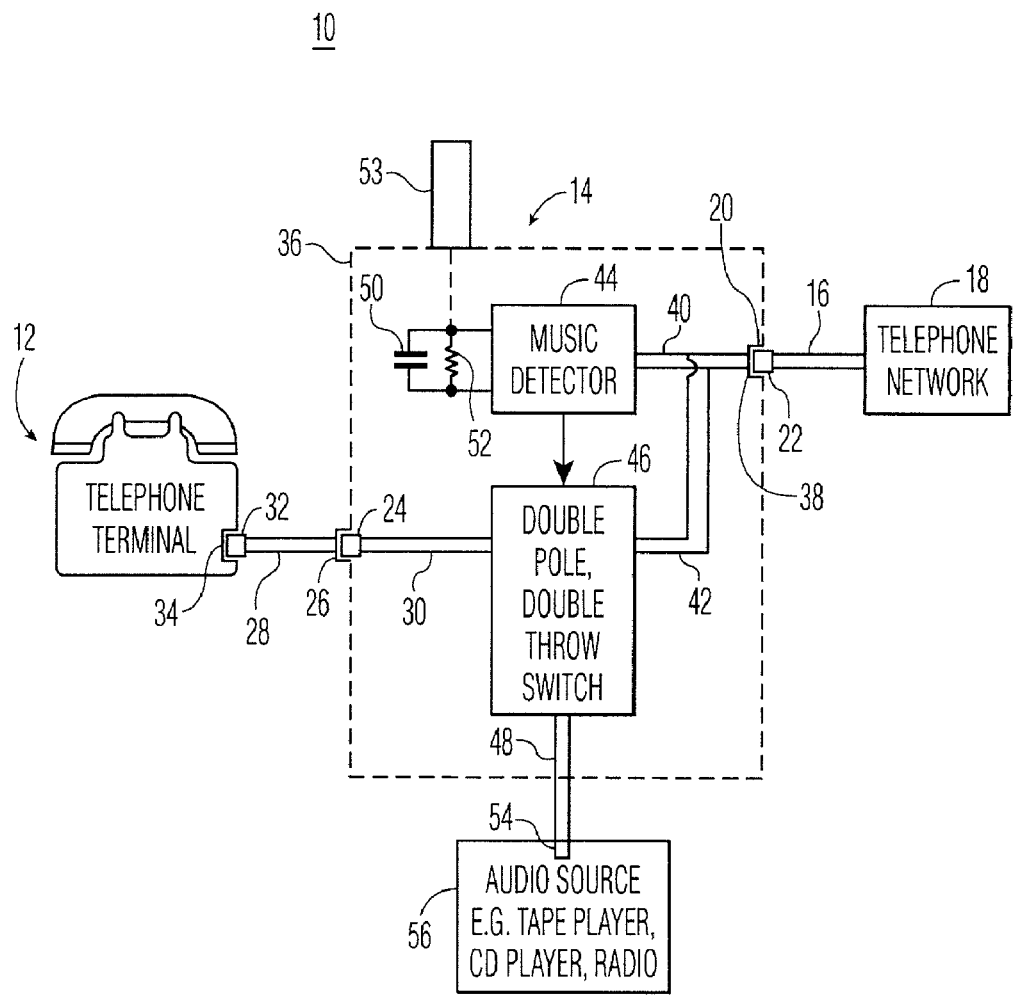

Reference is now made to the FIGURE wherein telephone station 10, including telephone terminal 12 and telephone adapter 14 is connected to telephone line 16, in turn connected to telephone network 18 including a second station (not shown) with capabilities of transferring a user of telephone terminal 12 to a hold status. During the hold status, the user at station 10 is subjected to music that the user is likely to find objectionable because it is boring or offensive. Telephone adapter 14 is arranged so that the user of telephone terminal 12 is not subjected to the objectionable music telephone line 16 couples to the adapter. The objectionable music on line 16 is automatically replaced by an audio signal (including silence) from an audio source of the choice of the user. The user can, if he/she so desires, overcome the automatic replacing feature.

To these ends, adapter 14 includes female telephone connector 20, of a conventional type, that is connected to male telephone connector 22 at the end of line 16 Adapter 14 also includes male telephone connector 24, of a conventional type, adapted to be connected to female telephone connector 26 at the end of telephone line 28, which is connected to telephone terminal 12 by connectors 32 and 34 respectively at the end of line 28 and in telephone terminal 12. Connectors 20 and 24, as well as the circiuts connected to them which are a part of adapter 14, are located in housing 36, with connectors 20 and 24 being on walls of the housing.

Connector 20 includes a pair of terminals 38 which are connected by cables 40 and 42 to music detector 44 and double pole double throw switch 46. In normal operation, detector 44 activates double pole double throw switch 46 so that terminals 38 are connected to corresponding terminals of male telephone connector 24, causing normal connections to exist between telephone terminal 12 and telephone line 16 and telephone network 18 by way of adapter 14 Music detector 44 can be of any conventional type, but preferably detects beats associated with music, rather than voice signals. The contacts of switch 46 are connected to terminals of cable 48 when detector 44 detects music on cable 40. Music detector 44 is typically powered by battery 50 through normally closed switch contacts 52. The user of telephone terminal 12 at station 10 can open switch contacts 52 by manually activating spring biased push button switch 53 to disconnect battery 50 from detector 44 and thereby disable the detector.

Cable 48 extends through a wall of housing 36 and includes at its end earphone jack 54 which is adapted to be connected to an earphone receptacle of audio source 56, such as a magnetic tape playback unit, a compact disk (CD) player or a radio receiver, which is the choice of the user of terminal 12.

In typical operation, a user of telephone terminal 12 places a call to the second station which is connected to network 18. The second station is associated with a business that sells goods and/or services the user wants to buy. The user of telephone terminal 12 is placed on hold by the second station shortly after the call is placed. The second station then begins transmitting objectionable music to the user of terminal 12 via network 18. Music detector 44 of adapter 14 detects the music the second station is transmitting over network 18 and which is coupled to detector 44 via line 16, connectors 20 and 22 and cable 40. In response to detector 44 detecting music from cable 40, the detector activates double pole double throw switch 46, which is essentially a processor, to decouple the signal on cable 42 from telephone terminal 12. Detector 44 then activates switch 46 so that the signal from audio source 56 is coupled via earphone jack 54 and cable 48 through the switch to cable 30, thence via connectors 24 and 26 and telephone line 28, as well as connectors 32 and 34 to telephone terminal 12. Thereby, the objectionable music or other audio content transmitted by the second terminal to telephone terminal 12 is replaced by music that is the choice of the user of telephone terminal 12, or silence, as the user of the telephone terminal desires.

If the user of telephone terminal 12 decides that he/she wants to listen to the music being coupled to adapter 14 from the second station, the user manually activates push button 53 to open switch contacts 52 and disconnect battery 50 from detector 44, thereby disabling music detector 44. Since switch 46 is normally arranged so that the signal on cable 42 is coupled through switch 46 to cable 30, disabling music detector 44 causes telephone terminal 12 to be connected to telephone line 16 and telephone network 18. The user closes contacts 52 when he/she no longer wishes to hear the music originating at the second station by releasing push button 53.

In response to the music from the second station being decoupled from telephone line 16 as a result of (1) a person at the second station responding to the call from telephone terminal 12 or (2) a recorded voice message being transmitted from the second station to station 10 via network 18 and line 16, music detector 44 is deactivated. In response to deactivation of music detector 44, switch 46 is activated so that cable 42 is connected to cable 30 and the audio signal on cable 48 is decoupled from cable 30. Thereby, the user of telephone terminal 12 is able to hear either the recorded voice message from the second station or the voice of a person at the second station.

While there has been described and illustrated a specific embodiment of the invention, it will be clear that variations in the details of the embodiment specifically illustrated and described may be made without departing from the true spirit and scope of the invention as defined in the appended claims. For example, battery 50 can be replaced by an appropriate AC to DC power supply driven by a wall outlet. Audio source 56 can be silence, which is particularly desirable for telephone users who want to be engaged in some other activity requiring concentration while waiting to hear a voice message from the second station. The audio source can also be included within the adapter 14 or the housing of telephone terminal. The components in adapter 14 can be located within the housing of telephone terminal 12 and the functions provided by music detector 44 and switch 46 can be provided by an appropriately programmed digital processor. The objectionable audio source transmitted by the second station is not necessarily music. Some businesses which place telephone users on hold interject objectionable commercials with messages of interest. The commercials can frequently be detected by detecting a sudden, substantial and sustained increase in audio signal level. Detector 44 can be arranged to detect such a sudden, substantial and sustained increase in audio signal level, as well as music.

The invention claimed is:

1. A method of enabling a telephone user who is at a first telephone station and is placed on hold at a second station from listening to an objectionable audio signal while a call is in process between the user and the second telephone station, the method comprising:
   detecting the objectionable audio signal transmitted from the second station while the call is in process,
   automatically decoupling the first station from a network of the second station responsive to said detection, thereby preventing the user from hearing the objectionable audio signal while the objectionable audio signal is being detected;
   automatically coupling the first station to an alternative signal chosen by the user;
   detecting the end of the objectionable audio signal and
   responding to the detection of the end of the objectionable audio signal by automatically re-coupling the first station to the second telephone station.

2. The method of claim 1 wherein the user is prevented from hearing the objectionable audio signal by substituting an audio signal that is a choice of the user while the user is prevented from hearing the objectionable audio signal.

3. The method of claim 2 wherein the audio signal that is a choice of the user is supplied to the user via a telephone at the first station.

4. The method of claim 3 wherein the objectionable audio signal is music.

5. The method of claim 4 wherein the music is detected in response to detection of a beat pattern.

6. The method of claim 2 wherein the objectionable audio signal is music.

7. The method of claim 6 wherein the music is detected in response to detection of a beat pattern.

8. The method of claim 1 wherein the objectionable audio signal is music.

9. The method of claim 8 wherein the music is detected in response to detection of a beat pattern.

10. Apparatus for enabling a telephone user who is at a first telephone station and placed on hold at a second station from listening to an objectionable audio signal while a call is in process between the user and the second telephone station, the apparatus comprising:
    a detector for detecting the objectionable audio signal while the call is in process,
    a processor arrangement coupled to be responsive to the detector for
    automatically decoupling the first station from a network of the second station responsive to said detection, thereby preventing the user from hearing the objectionable audio signal while the objectionable audio signal is being detected;

automatically coupling the first station to an alternative signal chosen by the user;

detecting the end of the objectionable audio signal, and automatically re-coupling the first station to the second telephone station in response to detection of the end of the objectionable audio signal.

11. The apparatus of claim 10 wherein the processor is arranged for preventing the user from hearing the objectionable audio signal by substituting an audio signal that is a choice of the user for the objectionable audio signal.

12. The apparatus of claim 11 wherein the processor is arranged for causing the audio signal that is a choice of the user is supplied to the user via a telephone at the first telephone station.

13. The apparatus of claim 12 wherein the objectionable audio signal is music.

14. The apparatus of claim 13 wherein the detector is arranged to detect the objectionable music signal in response to detection of a beat pattern.

15. The apparatus of claim 11 wherein the objectionable audio signal is music.

16. The apparatus of claim 15 wherein the detector is arranged to detect the objectionable music signal in response to detection of a beat pattern.

17. The apparatus of claim 10 wherein the objectionable audio signal is music.

18. The apparatus of claim 17 wherein the detector is arranged to detect the objectionable music signal in response to detection of a beat pattern.

19. A telephone station, comprising:

a telephone terminal;

a switch connected to the telephone terminal; and a detector in electrical communication with a telephone line for detecting an objectionable audio signal while the telephone terminal is placed on hold during a call in process, wherein the detector is operable to activate the switch to facilitate a coupling of the telephone terminal to the telephone line in response to failure by the detector to detect an objectionable audio signal from the telephone line, and wherein the detector is further operable to activate the switch to prevent a coupling of the telephone terminal to the telephone line in response to a detection by the detector of the objectionable audio signal from the telephone line and facilitate a coupling of the telephone terminal to a signal from an alternative audio source.

20. The telephone station of claim 19, further comprising:

an audio source connected to the switch, wherein the detector is further operable to active the switch to facilitate a coupling of the telephone terminal to the audio source in response to the detection by the detector of the objectionable audio signal from the telephone line.

* * * * *